United States Patent
Takahashi et al.

(10) Patent No.: US 8,116,035 B2
(45) Date of Patent: Feb. 14, 2012

(54) MAGNETIC RECORDING MEDIUM HAVING A SECONDARY RECORDING LAYER MADE OF A MATERIAL HAVING A NEGATIVE CRYSTAL MAGNETIC ANISOTROPY AND MAGNETIC RECORDING AND REPRODUCING APPARATUS

(75) Inventors: Migaku Takahashi, Sendai (JP); Masahiro Oka, Ichihara (JP); Akira Kikitsu, Minato-ku (JP)

(73) Assignees: Tohoku University, Miyagi-ken (JP); Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 1099 days.

(21) Appl. No.: 11/917,088

(22) PCT Filed: Jun. 9, 2006

(86) PCT No.: PCT/JP2006/312086
§ 371 (c)(1),
(2), (4) Date: Dec. 10, 2007

(87) PCT Pub. No.: WO2006/135034
PCT Pub. Date: Dec. 21, 2006

(65) Prior Publication Data
US 2009/0231755 A1   Sep. 17, 2009

Related U.S. Application Data (60) Provisional application No. 60/693,091, filed on Jun. 23, 2005.

(30) Foreign Application Priority Data

Jun. 13, 2005   (JP) .................. 2005-172601

(51) Int. Cl.
*G11B 5/74*   (2006.01)
*G11B 5/66*   (2006.01)

(52) U.S. Cl. .................. 360/131; 360/135; 428/829
(58) Field of Classification Search .......... 360/131–136; 428/818–820.6, 827–830, 839–839.6, 836.1
See application file for complete search history.

(56) References Cited

U.S. PATENT DOCUMENTS
5,665,460 A   9/1997   Sugita et al.
(Continued)

FOREIGN PATENT DOCUMENTS
JP   3235003 B2   3/1995
(Continued)

OTHER PUBLICATIONS

JP Notice of Reasons for Rejection, dated Aug. 4, 2009, issued in corresponding JP Application No. 2005-172601, 6 pages in English and Japanese.

(Continued)

*Primary Examiner* — A. J. Heinz
(74) *Attorney, Agent, or Firm* — Sughrue Mion, PLLC (57) ABSTRACT

The invention provides a magnetic recording medium, and a magnetic recording and reproducing apparatus. The magnetic recording medium includes a substrate 11, an under layer 12 formed on the substrate 11, a magnetic recording layer 13 formed on the under layer 12, and a protective layer 14 formed on the magnetic recording layer 13. The magnetic recording layer 13 is composed of a primary recording layer 14 and a secondary recording layer 15 which are mutually exchange-coupled. The primary recording layer 14 has magnetic grains and a nonmagnetic material that surrounds the magnetic grains, and has a perpendicular magnetic anisotropy. The secondary recording layer 15 is made of a material having a negative crystal magnetic anisotropy and its easy plane of the magnetization is a plane of the medium.

10 Claims, 6 Drawing Sheets

U.S. PATENT DOCUMENTS

| | | | |
|---|---|---|---|
| 6,830,824 B2 * | 12/2004 | Kikitsu et al. | 428/828.1 |
| 6,881,495 B2 | 4/2005 | Kikitsu et al. | |
| 7,038,873 B2 | 5/2006 | Shimazaki et al. | |
| 7,128,987 B2 * | 10/2006 | van de Veerdonk et al. | 428/828 |
| 7,144,640 B2 | 12/2006 | Hee et al. | |
| 7,147,940 B2 * | 12/2006 | Maeda et al. | 428/827 |
| 7,179,548 B2 * | 2/2007 | Mukai | 428/828 |
| 7,498,092 B2 | 3/2009 | Berger et al. | |
| 2003/0017364 A1 | 1/2003 | Kikitsu et al. | |

FOREIGN PATENT DOCUMENTS

| | | |
|---|---|---|
| JP | 8-129736 A | 5/1996 |
| JP | 2002-197635 A | 7/2002 |
| JP | 2002-216333 A | 8/2002 |
| JP | 2003-16620 A | 1/2003 |
| JP | 2005-038569 A | 2/2005 |
| JP | 2005-056555 A | 3/2005 |
| JP | 2006-209943 A | 8/2006 |
| WO | 01/93286 A1 | 12/2001 |

OTHER PUBLICATIONS

Kai-Zhong Gao et al., Magnetic Recording Configuration for Densities Beyond 1 Tb/in2 and Data Rates Beyond 1 Gb/s, IEEE Transactions on Magnetics, Nov. 2002, pp. 3675-3683, vol. 38, No. 6.

R.H. Victora et al., Composite Media for Perpendicular Magnetic Recording, IEEE Transactions on Magnetics, Feb. 2005, pp. 537-542, vol. 41, No. 2.

* cited by examiner

MAGNETIC RECORDING MEDIUM HAVING A SECONDARY RECORDING LAYER MADE OF A MATERIAL HAVING A NEGATIVE CRYSTAL MAGNETIC ANISOTROPY AND MAGNETIC RECORDING AND REPRODUCING APPARATUS

CROSS REFERENCE TO RELATED APPLICATIONS

This application claims priority based on Japanese Patent Application No. 2005-172601, filed Jun. 13, 2005, and claims benefit of U.S. Provisional Application No. 60/693,091 filed on Jun. 23, 2005.

TECHNICAL FIELD

The present invention relates to a magnetic recording medium and a magnetic recording and reproducing apparatus.

BACKGROUND ART

With the increase over the past few years in computer processing speeds, there has been a desire for higher recording speeds and densities in magnetic recording and reproducing apparatus that record and retrieve data signals, such as hard disk drives (HDD). Current HDDs make use of a longitudinal magnetic recording method in which the direction of magnetization lies within the plane of the magnetic recording medium. However, to attain an even higher recording density in HDDs, a perpendicular magnetic recording method in which the direction of magnetization is oriented normal to the medium is advantageous because a sharp magnetization transition is achieved.

Moreover, with regard to the thermal fluctuation that has become a concern in recent magnetic recording media, because perpendicular magnetic recording technology allows the magnetic recording layer on the medium to be made thicker than would be possible with longitudinal magnetic recording technology, deterioration of the recorded signals can be minimized.

Research on perpendicular magnetic recording layers has been focused primarily on CoCr alloy-based (e.g., CoCrPti alloy) magnetic layers which have an irregular hexagonal closed packed (hcp) crystal structure. To address the problem of thermal fluctuation, considerable research has also been done on materials having a larger magnetic anisotropy (Ku).

However, because the magnetic anisotropy Ku is in direct proportion to the coercivity (Hc), a larger recording magnetic field is required to such materials having a large anisotropy Ku. Hence, in such perpendicular magnetic recording media, the anisotropy Ku is often set to a value close to the upper limit in the recording ability of the head.

Here, if the coercivity Hc could be lowered while keeping the anisotropy Ku large, it would be possible to obtain a perpendicular magnetic recording medium having a good resistance to thermal fluctuation.

Tilted perpendicular magnetic recording media (referred to below as "tilted media") in which the direction of easy axis of the magnetization in the magnetic recording layer is tilted with respect to the direction normal to the medium have recently been described (e.g., see Patent Documents 1 and 2, and Non-Patent Document 1). That is, whereas in conventional perpendicular magnetic recording media the crystal planes of the magnetic crystal grains are oriented so that the easy axis directs normal to the medium, these tilted media are characterized in that the crystal planes of the magnetic crystal grains are oriented so that the easy axis is tilted with respect to the normal to the medium.

Non-Patent Document 1 reports the coercivity Hc decreases due to angle between the direction of the applied magnetic field, which is normal to the medium, and the direction of easy axis of the magnetization. Theoretically, it has been found that the smallest coercivity Hc can be achieved when the angle of the direction of the applied magnetic field and the direction of easy axis is 45°. The coercivity Hc achieved at an intersection angle of 45° is about one-half that when the angle is 0°.

To orient the direction of the easy axis of the magnetization in the magnetic recording layer so that it is tilted with respect to the normal to the medium, it is desirable to employ an under layer which enables the growth of magnetic crystal grains having such an orientation. However, little research has been done on such under layers for the CoCrPt alloy magnetic layers currently in practical use.

Furthermore, a practically useful tilted medium requires a "granular structure" in which the magnetic crystal grains are separated by a nonmagnetic material. Yet, in the CoCrPt alloy magnetic layers mentioned above, little research has been done on methods for achieving a granular structure in which the magnetic crystal grains are oriented so that the easy axis of the magnetization (C axis) is tilted with respect to the normal to the medium.

Hence, numerous problems need to be resolved for thin film formation in order to achieve tilted media using current alloy-based magnetic materials. Moreover, in such tilted media, the magnetic crystal grains are oriented at an angle, which undesirably lowers the output. If the C axis grows at a random angle, the problem of a de-magnetization field in the magnetic transition region will arise in the same way as in conventional longitudinal magnetic recording.

In tilted media, because the magnetization vectors for individual magnetic grains face in different directions, when producing patterned media wherein the recording data or recording track shapes are imparted to the magnetic recording layer, large variations arise between the magnetic characteristics in each pattern. In spite of this, an under layer that grows the magnetic grains to be oriented uniformly at an angle in the circumferential direction.

Another approach that has been described for achieving tilted media (e.g., see Non-Patent Document 2) involves a composite medium composed of, in the above-described granular structure, magnetically isolated hard magnetic grains which are exchange-coupled with similarly isolated soft magnetic grains. When this composite medium is in a state where a magnetic field has not been applied, magnetization of the magnetic grains overall is oriented in the perpendicular direction. When a recording magnetic field is applied, the soft magnetic layer undergo a magnetic reversal and makes the magnetization of the exchange-coupled hard magnetic layer tilt and then ultimately resulting in a tilted medium.

This composite medium eliminates the need to form the easy axis of the magnetization of the hard magnetic layer with a tilt, thus making it unnecessary to control the orientation of the magnetic crystal grains. However, because neither a method of forming a soft magnetic layer having a granular structure nor a method of achieving a good crystal orientation of the hard magnetic grain on the soft magnetic grain has yet to be established, there remain unsolved challenges in the fabrication of such a medium.

Also, in composite media, to obtain the above-described effect, it is necessary for the soft magnetic layer to have a large thickness. However, because magnetization by the individual magnetic grains becomes larger in such a case, magneto static coupling between the magnetic grains will affect the recordability or the stability of the recorded pattern. In addition, the material margin becomes narrower.

Patent Document 1: Japanese Unexamined Patent Application Publication JP-Hei8-129736A Patent Document 2: Japanese Patent Publication JP-3235003B Non-Patent Document 1: IEEE Transaction on Magnetics, Vol. 38, pp. 3675-3683.

Non-Patent Document 2: IEEE Transaction on Magnetics, Vol. 41, pp. 537.

DISCLOSURE OF INVENTION

As explained above, it is difficult to obtain magnetically separated soft magnetic areas to achieve a tilted medium with reduced coercivity of perpendicular magnetic recording media which has high magnetic anisotropy (Ku) and high coercivity (Hc). Moreover, because the saturation magnetization (Ms) should be larger, the medium design margin ends up being narrower.

The present invention was arrived at in order to resolve the above problems. It is therefore an object of the present invention to provide a tilted-type perpendicular magnetic recording medium which is easy to manufacture and which is readily conducive to design of the medium. Another object of the invention is to provide a magnetic recording and reproducing apparatus which uses such a medium.

Accordingly, the invention provides the following.

(1) A magnetic recording medium which includes a substrate, an under layer formed on the substrate, a magnetic recording layer formed on the under layer, and a protective layer formed on the magnetic recording layer. The magnetic recording layer is composed of a primary recording layer and a secondary recording layer which are mutually exchange-coupled. The primary recording layer has magnetic grains and a nonmagnetic material that surrounds the magnetic grains, and has a perpendicular magnetic anisotropy. The secondary recording layer is made of a material having a negative crystal magnetic anisotropy and has an easy plane of the magnetization in a plane of the medium.

(2) The magnetic recording medium of (1) above which is characterized in that the magnetic recording layer is separated, within the plane of the medium, into magnetic areas and nonmagnetic areas, and these areas are regularly arranged circumferentially on the medium.

(3) The magnetic recording medium of (1) or (2) above which is characterized in that the crystal magnetic anisotropy of the secondary recording layer has an absolute value of at least $10^5$ erg/cc.

(4) The magnetic recording medium of any one of (1) to (3) above which is characterized in that the secondary recording layer has a thickness of at least 1 nm.

(5) The magnetic recording medium of any one of (1) to (4) above which is characterized in that the secondary recording layer has a thickness which is not more than one-half the thickness of the primary recording layer.

(6) The magnetic recording medium of any one of (1) to (5) above which is characterized in that the secondary recording layer includes one or more types of alloy selected from among CoIr, CoFe, MnSb, FeC and $Fe_3Pt$.

(7) The magnetic recording medium of any one of (1) to (6) above which is characterized in that the secondary recording layer is CoIr and has an iridium content of 5 to 40 atomic percent.

(8) The magnetic recording medium of any one of (1) to (7) above which is characterized by having, below the secondary recording layer, an crystalline under layer with hexagonal close-packed lattice planes or tetragonal lattice planes oriented within a plane parallel to the substrate.

(9) A magnetic recording and reproducing apparatus which includes the magnetic recording medium of any one of (1) to (8) above, and a magnetic head which writes signals to and reads signals from the magnetic recording medium.

(10) The magnetic recording and reproducing apparatus of (9) above which is characterized in that the magnetic head is a single-pole type magnetic head.

In the above figures, the numeric symbol 1 indicates magnetic disk (magnetic recording medium), 11 indicates substrate, 12 indicates under layer, 13 indicates magnetic recording layer, 14 indicates protective layer, 15 indicates secondary recording layer, 16 indicates primary recording layer, 17 indicates magnetic grain, 18 indicates nonmagnetic material, 20 indicates pattern, 21 indicates data track region, 22 indicates servo signal region, 30 indicates hard disk drive (magnetic recording and reproducing apparatus), 31 indicates housing, 32 indicates magnetic head, 33 indicates head suspension assembly, 34 indicates actuator, 35 indicates circuit board, 36 indicates suspension, 37 indicates arm.

BEST MODE FOR CARRYING OUT THE INVENTION

The magnetic recording medium and magnetic recording and reproducing apparatus of the present invention are described below in detail while referring to the accompanying diagrams. In the diagrams used in conjunction with the following description, for the sake of convenience certain distinctive features are shown enlarged to aid in a better understanding of the invention. Accordingly, these diagrams do not necessarily reflect with any accuracy the relative dimensions of the individual components.

First, the magnetic recording medium according to the invention is described.

Figure 1:
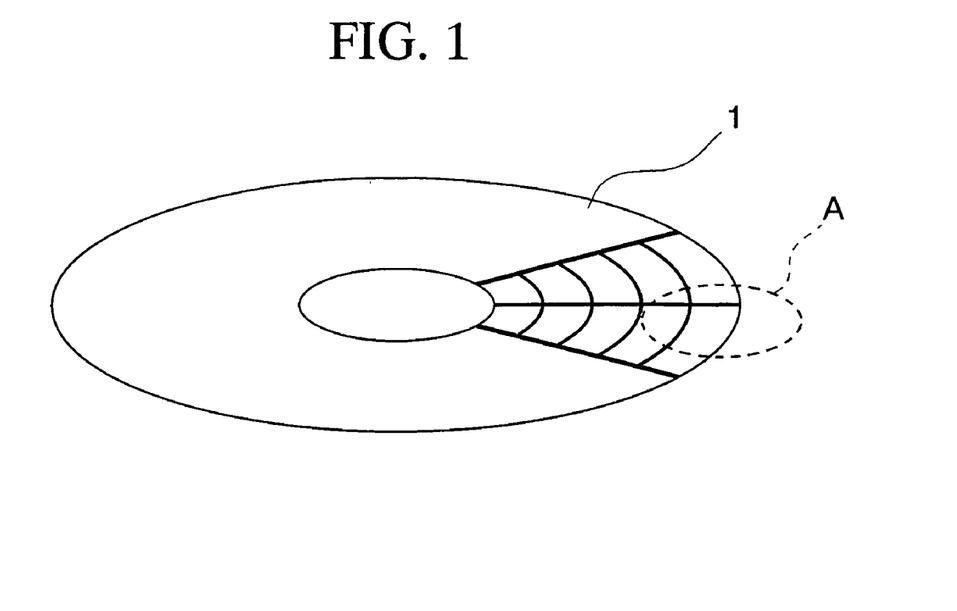
FIG. 1 is a perspective view of a magnetic recording medium according to the invention.
Figure 2:
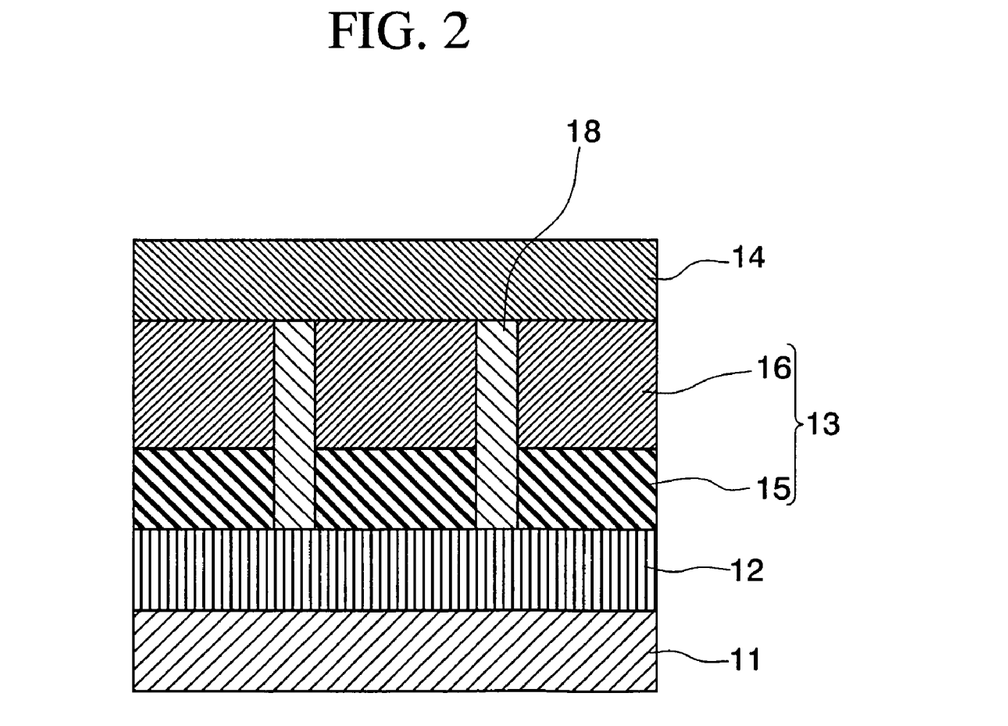
FIG. 2 is a cross-sectional view showing the layered structure of the magnetic recording medium in FIG. 1.

The magnetic recording medium of the invention is typically, as shown in FIG. 1, a magnetic disk 1 of the type used in magnetic recording and reproducing apparatus such as hard disk drives (HDD). This magnetic disk 1 includes at least, as shown in FIG. 2, a substrate 11, an under layer 12 formed on the substrate 11, a magnetic recording layer 13 formed on the under layer 12, and a protective layer 14 formed on the magnetic recording layer 13.

The substrate 11 may be a nonmagnetic substrate made of a material such as glass, aluminum alloy, ceramic, carbon, or single-crystal silicon with an oxide surface. The glass is exemplified by amorphous glass and crystallized glass. Suitable examples of amorphous glass include general-purpose soda-lime glass and aluminosilicate glass. Suitable examples of crystallized glass include lithium-based crystallized glass. Suitable examples of ceramic include sintered materials composed primarily of aluminum oxide, aluminum nitride or silicon nitride; and fiber-reinforced forms of such sintered materials. Alternatively, use can be made of a substrate 11 that is a metal or nonmetallic substrate as described above and has on a surface thereof an NiP layer formed by plating or sputtering. The substrate 11 may be of any hitherto known size, such as 3.5 inches, 2.5 inches, 1.8 inches, 1 inch, 0.85 inch or 0.8 inch.

The under layer 12 has a number of purposes, including control of the crystals in the magnetic recording layer 13, control of the crystal grain size, and the improvement of adhesion. The under layer 12 may be made of a material used in conventional magnetic recording media, such as a metal, a dielectric, or a mixture thereof. To efficiently achieve the above objects, the under layer 12 may be composed of a plurality of layers. Moreover, the surface of the under layer 12 may be modified, such as by ion irradiation or gas exposure.

It is also possible to use a magnetic material in the under layer 12. In cases where a soft magnetic underlayer (SUL) of high-permeability soft magnetic material is provided between the substrate 11 and the magnetic recording layer 13, the under layer 12 can be made of what is sometimes referred to as a "perpendicular two-layer medium." The soft magnetic underlayer SUL in this perpendicular two-layer medium has some of the functions of a magnetic head for magnetizing the perpendicular magnetic recording layer. For example, it has the function of allowing the recording magnetic field from a single-pole type head to pass through in the horizontal direction and close on itself to the magnetic head side. Moreover, the ability to apply sufficient perpendicular magnetic field to the magnetic recording layer 13 enables the recording and reproducing efficiency to be enhanced.

The soft magnetic underlayer SUL may be made of iron or an iron-based material containing nickel or cobalt, illustrative examples of which include FeCo alloys such as FeCo and FeCoV; FeNi alloys such as FeNi, FeNiMo and FeNiSi; FeAl or FeSi alloys such as FeAl, FeAlSi, FeAlSiCr, FeAlSiTiRu and FeAlO; FeTa alloys such as FeTa, FeTaC and FeTaN; and FeZr alloys such as FeZrN. Alternatively, the soft magnetic underlayer SUL may be made of a material having a microcrystalline structure with an iron content of at least 60 atomic percent, such as FeAlO, FeMgO, FeTaN or FeZrN; or a material having a granular structure composed of fine crystal grains dispersed in a matrix.

In addition, a cobalt alloy containing cobalt and at least one element from among zirconium, hafnium, niobium, tantalum, titanium and yttrium may be used in the soft magnetic underlayer SUL. The cobalt alloy has a cobalt content of preferably at least 80 atomic percent. An amorphous layer readily forms when such a cobalt alloy is applied as a film by sputtering. When such an amorphous layer has been formed, because the amorphous soft magnetic material is free of crystal magnetic anisotropy, crystal defects and grain boundaries, it exhibits an outstanding soft magnetism. Moreover, by using this amorphous soft magnetic material, a low-noise medium can be achieved. Preferred examples of amorphous soft magnetic materials include CoZr, CoZrNb and CoZrTa alloys.

An under layer may be provided below the soft magnetic underlayer SUL so as to enhance the crystallinity of the soft magnetic underlayer SUL and improve adhesion with the substrate 11. This under layer may be composed of, for example, titanium, tantalum, tungsten, chromium, platinum, an alloy containing these, or an oxide or nitride.

A portion of the plurality of layers making up the under layer 12 may be in the form of an intermediate layer made of a nonmagnetic material that is provided between the soft magnetic underlayer SUL and the magnetic recording layer 13. The purposes of this intermediate layer are to block exchange coupling interactions between the soft magnetic underlayer SUL and the magnetic recording layer 13, and to control the crystallinity of the magnetic recording layer 13. This intermediate layer may be made of ruthenium, rhenium, platinum, palladium, tungsten, titanium, tantalum, chromium, silicon, an alloy containing these, or an oxide or nitride.

To prevent spike noise, the soft magnetic underlayer SUL can be divided into a plurality of layers and given an antiferromagnetically coupled structure by inserting, for example, 0.5 to 1.5 nm of ruthenium between the respective layers. Alternatively, a pinning layer composed of a hard magnetic layer made of, for example, CoCrPt, SmCo or FePt and having in-plane anisotropy, an antiferromagnetic material such as IrMn or PtMn, may be used by exchange-coupling with a soft magnetic layer. In this case, to control the exchange coupling strength, a magnetic layer (e.g., cobalt) or a nonmagnetic layer (e.g., platinum) may be applied before and after the ruthenium layer.

The magnetic recording layer 13 is composed of a secondary recording layer 15 and a primary recording layer 16 formed on the secondary recording layer 15. The primary recording layer 16 and the secondary recording layer 15 are mutually exchanged-coupled. To mutually exchange-couple the primary recording layer 16 and the secondary recording layer 15, it is preferable for the primary recording layer 16 and the secondary recording layer 15 to be in mutual contact. Alternatively, even if the primary recording layer 16 and the secondary recording layer 15 are not in mutual contact, by having the distance there between be 2 nm or less, an intermediate layer of up to 2 nm and composed of a nonmagnetic material can be provided between the primary recording layer 16 and the secondary recording layer 15 to effect an exchange coupling interaction.

The magnetic recording layer 13 may be provided with an intermediate layer composed of a magnetic material in order to adjust the exchange-coupling strength between the primary recording layer 16 and the secondary recording layer 15. Moreover, the magnetic recording layer 13 is not limited to a structure in which, as shown in FIG. 2, the primary recording layer 16 is situated over the secondary recording layer 15. For example, the secondary recording layer 15 may instead be situated over the primary recording layer 16. Alternatively, the magnetic recording layer 13 may have a structure composed of a plurality of these primary recording layers 16 and secondary recording layers 15 in a stacked arrangement. For example, when the structure is one in which a primary recording layer 16, a secondary recording layer 15, and a primary recording layer 16 are arranged in this order, the exchange coupling force acting on the secondary recording layer 15 can be doubled, enabling a larger medium design margin to be obtained. It is also possible to adopt a structure in which a plurality of magnetic layers and nonmagnetic layers are stacked together for the primary recording layer and the secondary recording layer. For example, by using a technique that involves the insertion of a ruthenium layer between a plurality of magnetic layers to induce antiferromagnetic exchange coupling, the linear recording density can be increased.

The presence or absence of exchange coupling between the secondary recording layer 15 and the primary recording layer 16 can be determined from a hysteresis loop. When the layers are not exchange-coupled, the hysteresis loops for the respective layers simply overlap, whereas when the layers are exchange-coupled, they undergo mutual changes in hysteresis. A distinctive feature of the invention is that exchange coupling with the secondary recording layer 15 lowers the coercivity (Hc) inherent to the primary recording layer 16. Therefore, the existence of exchange coupling can be confirmed by a hysteresis loop which indicates a smaller coercivity Hc than the coercivity Hc estimated from computations of the magnetic anisotropy Ku of the primary recording layer 16 measured by, for example, torque measurements. Such a determination can also be made from the characteristics of the hysteresis loops which are subsequently described in detail.

The primary recording layer 16 is composed of a hard magnetic material having perpendicular magnetic anisotropy. That is, the primary recording layer 16 is a perpendicular magnetized layer composed of magnetic crystal grains whose easy axes of magnetization are for the most part oriented perpendicular to the medium. If the magnetic crystal grains making up this primary recording layer 16 are composed of an cobalt alloy, such as a CoPt alloy, a large anisotropy can be obtained. In addition to cobalt and cobalt alloys containing chromium or platinum, the magnetic crystal grains may include at least one element selected from among boron, tantalum, molybdenum, copper, neodymium, tungsten, niobium, samarium, terbium, ruthenium and rhenium. By including these elements, the crystallinity and orientation of the magnetic grains can be improved and the magnetic properties can be adjusted, which makes recording and reproducing properties and thermal fluctuation properties more suitable for high-density recording can be achieved. Use may instead be made of what is referred to as a "magnetic artificial lattice" in which cobalt and noble metals such as platinum and palladium are arranged in numerous layers. Alternatively, use may be use of an ordered phase alloy composed of iron or cobalt in combination with platinum or palladium. Also, the primary recording layer 16 may itself have a multilayer construction. By stacking two or more magnetic layers of differing magnetic characteristics, a higher recording density can be achieved.

The primary recording layer 16 has a thickness of preferably 2 to 60 nm, and more preferably 3 to 30 nm. If the thickness of the primary recording layer 16 is less than 2 nm, the read output may be too low and the noise component may become higher. On the other hand, a primary recording layer 16 thickness of more than 60 nm may result in too large a read output, distorting the waveform. By setting the thickness of the primary recording layer 16 within the above range, a magnetic recording medium suitable for achieving a higher recording density can be obtained. To prevent a degradation in the resistance to thermal fluctuation, it is preferable for the coercivity of the primary recording layer 16 alone to be set to at least 237,000 A/m (3 kOe). The primary recording layer 16 has a magnetic anisotropy Ku of preferably at least $10^6$ erg/cc.

Figure 3:
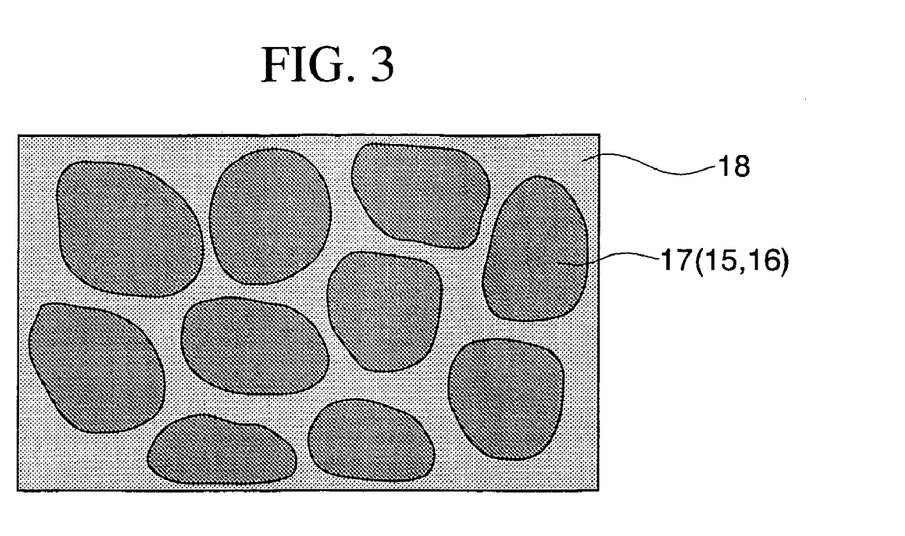
FIG. 3 is a schematic diagram showing the granular structure of the magnetic recording medium in FIG. 1.

As shown schematically in FIG. 3, the primary recording layer 16 has a granular structure composed of magnetic grains 17 and a surrounding nonmagnetic material 18. In this granular structure, the magnetic grains 17 are each completely separated, although some of the particles 17 may not be separated provided this does not pose a problem for magnetic recording. In FIG. 3, the secondary recording layer 15 also has a granular structure, although for the purposes of the invention this secondary recording layer 15 may have a granular structure, may be a continuous layer, or may have a structure that includes both (e.g., with the upper half having a granular structure).

The secondary recording layer 15 is made of a magnetic material having negative crystal magnetic anisotropy (Ku) and has an easy plane of magnetization (C plane) oriented parallel to the plane of the medium. That is, difficult axis of the magnetization of this secondary recording layer 15 (C axis) is perpendicular to the plane of the medium. Because the easy axis of magnetization at the magnetic crystal grains making up this secondary recording layer 15 is not in a specific in-plane direction, the direction of magnetization may be set to any direction within the plane of the medium. In the invention, the plane in which the easy axis of magnetization lies is defined as "the easy plane of magnetization.", because the easy axis of magnetization cannot be defined as a specific direction in the plane of the layer. This differs from magnetic materials with a positive crystal magnetic anisotropy (Ku) in which the easy axis of magnetization directs one direction within the plane of the medium, such as CoCr alloys lies in the plane of the medium, and fcc crystals in which the easy axis of magnetization lies in four directions. Examples of materials which exhibit in-plane easy plane include CoIr, CoFe, MnSb, FeC and $Fe_3Pt$.

By exchange coupling the secondary recording layer 15 with the primary recording layer 16, the inventive magnetic recording medium becomes a tilted medium. To make the most of the performance of this medium as a tilted medium, it is preferable for the secondary recording layer 15 to have a magnetic anisotropy Ku with an absolute value of at least $10^5$ erg/cc.

Specifically, the exchange-coupled primary recording layer 16 and secondary recording layer 15 undergo thermal fluctuations as a single unit. Hence, if the magnetic anisotropy Ku of the secondary recording layer 15 also is not large, the resistance of the overall magnetic recording layer to thermal fluctuation will decline. For example, the composite medium described in Non-Patent Document 2 uses as the secondary recording layer a soft magnetic material having a magnetic anisotropy that can be regarded as 0. The resistance to thermal fluctuation must therefore be furnished entirely by the primary recording layer, as a result of which the combined thickness of the primary recording layer and the secondary recording layer inevitably becomes large. This is undesirable in a perpendicular magnetic recording medium in which the distance between the soft magnetic underlayer SUL and the recording head needs to be small. Here, the easy axes of anisotropy for the secondary recording layer 15 and the primary recording layer 16 are mutually orthogonal, but direction plays no part in the resistance to thermal fluctuation. The reason is as follows: if the secondary recording layer 15 has a large magnetic anisotropy Ku, the magnetization microstructure is determined by the balance of the energy of both layers and the resulting structure itself has a resistance to thermal fluctuation with average magnetic anisotropies Ku of the two layers. In light of this, it is desirable for the magnetic anisotropy Ku of the secondary recording layer 15 to be at least $10^5$ erg/cc, and preferably at least 1 Merg/cc.

Examples of secondary recording layer 15 materials which satisfy such conditions include the above-mentioned CoIr and CoFe, MnSb, FeC and $Fe_3Pt$. Of these, CoIr has advantages: it has the same hexagonal close packed (hcp) structure as the CoCrPt alloy used in current magnetic recording media for hard disk drives; it also has a similar lattice constant. Therefore, when a layer of CoCrPt is formed on C axis-oriented CoIr, the CoCrPt also will become C axis-oriented. In this case, the easy plane of magnetization for the CoIr making up the secondary recording layer 15 is the plane of the layer, and the easy axis of magnetization for the CoCrPt making up the primary recording layer 16 is perpendicular to the plane of the layer.

The C axis of CoIr formed on the CoCrPt can also be oriented perpendicular to the plane of the layer. That is, here too, the easy plane of magnetization for the CoIr making up the secondary recording layer 15 is the plane of the layer, and the easy axis of magnetization for the CoCrPt making up the primary recording layer 16 is perpendicular to the plane of the layer.

To obtain C axis oriented CoIr making up the secondary recording layer 15, it is desirable to place below the secondary recording layer 15 a crystalline under layer (under layer 12) oriented in a plane parallel to a hexagonal closest packing lattice plane or a tetragonal lattice plane. That is, by using a crystalline under layer oriented in a plane parallel to a hexagonal closest packing lattice plane or a tetragonal lattice plane, there can be obtained a thin film in which the C axis of CoIr is oriented in a perpendicular direction to the plane of the medium.

In the case of a CoCr alloy primary recording layer 16 or a CoIr secondary recording layer 15, e.g., ruthenium, platinum, palladium, NiCr, NiFeCr or magnesium having a hexagonal close packed (hcp) structure or a face-centered cubic (fcc) structure can be used as the under layer 12 to effect a C-axis perpendicular orientation in the secondary recording layer 15.

As noted above, in magnetic recording media according to the invention, regardless of whether a layer of CoCrPt is formed on a layer of CoIr, a layer of CoIr is formed on a layer of CoCrPt, or layers of CoIr and layers of CoCrPt are repeatedly formed on each other, the easy plane of magnetization for the CoIr serving as the secondary recording layer 15 can be made the plane of the film and the easy axis of magnetization for the CoCrPt that forms the primary recording layer 16 can be made perpendicular to the plane of the layer.

Moreover, in the magnetic recording medium according to the invention, the saturation magnetization (Ms) of the CoIr can be adjusted by the iridium content.

Specifically, when the iridium content has been set to 5 to 40 atomic percent, the magnetic anisotropy Ku of the secondary recording layer 15 can be made negative and its absolute value can be set to at least $10^5$ erg/cc.

The secondary recording layer 15 has a thickness of preferably at least 0.5 nm, and more preferably at least 1 nm. At a secondary recording layer 15 thickness of less than 0.5 nm, the effects of the magnetic recording medium as a tilted medium diminish, in addition to which it becomes difficult to ensure uniformity over the entire surface of the medium.

Also, the secondary recording layer 15 has a thickness which is preferably not more than one-half the thickness of the primary recording layer 16.

At a secondary recording layer 15 thickness greater than one-half the thickness of the primary recording layer 16, the main component of magnetization becomes in-plane, lowering the signal strength.

The protective layer 14 protects the magnetic recording layer 3 from corrosion and prevents damage to the surface of the magnetic recording medium when the magnetic head come into contact with the medium. Illustrative examples of the protective layer 14 include composed of carbon or containing a hard material such as Si—O, Zr—O or Si—N. The protective layer 14 has a thickness of preferably 0.5 to 10 nm. The distance between the magnetic head and the magnetic recording layer 13 can in this way be made small, making it possible to accommodate higher recording densities.

Moreover, in the inventive magnetic recording medium, a lubricating layer (not shown) may be provided on the protective layer 14. Illustrative examples of lubricants that may be used in the lubricating layer include materials known to the art, such as perfluoropolyethers, fluorinated alcohols and fluorinated carboxylic acids.

The magnetic recording medium of the invention with the above type of construction can achieve a tilted medium wherein the coercivity Hc of high-magnetic anisotropy (Ku) material of the perpendicular magnetic recording media can be reduced.

Figure 4A:
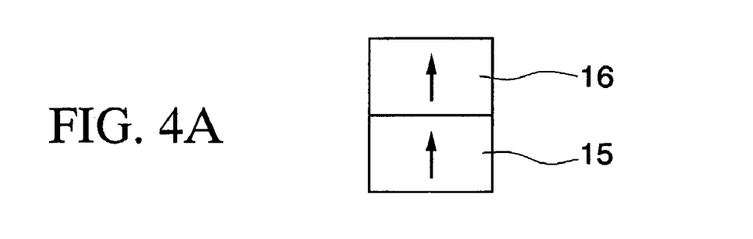
FIG. 4A is a schematic diagram depicting the process of magnetization reversal in the magnetic recording medium in FIG. 1.
Figure 4B:
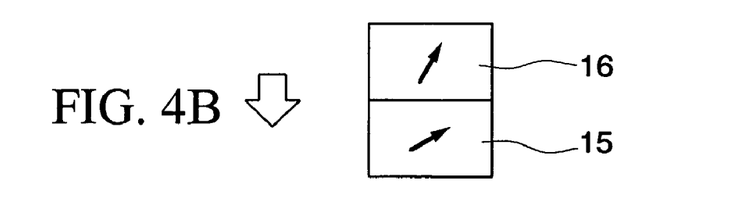
FIG. 4B is a schematic diagram depicting the process of magnetization reversal in the magnetic recording medium in FIG. 1.
Figure 4C:
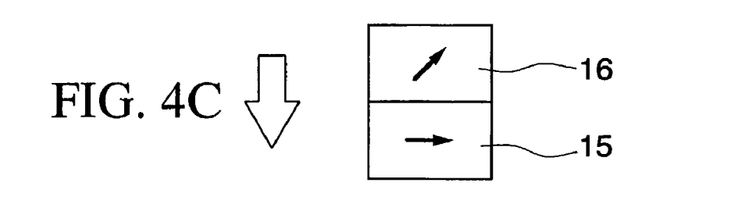
FIG. 4C is a schematic diagram depicting the process of magnetization reversal in the magnetic recording medium in FIG. 1.

The principle underlying the coercivity (Hc) lowering effect obtained in the present invention is described here while referring to FIGS. 4A-4C, which shows schematically the manner in which the secondary recording layer 15 and the primary recording layer 16 magnetize in the cross-sectional direction. In FIGS. 4A-4C, the white arrows indicate the direction of the exterior magnetic field, the lengths of the white arrows indicate the magnitude of the external magnetic field, and the black arrows indicate the direction of magnetization in each layer.

First, as shown in FIG. 4A, when there is no external magnetic field, magnetization of the secondary recording layer 15 and the primary recording layer 16 faces in substantially a single direction (upwards in FIG. 4A). That is, when the magnetic anisotropic energy of the primary recording layer 16 is larger than that of the secondary recording layer 15, magnetization of the secondary recording layer 15 also is oriented in the perpendicular direction. In reality, however, there are also cases in which a twisted magnetizing structure arises at the interior of the secondary recording layer 15.

Next, as shown in FIG. 4B, when a small inverse magnetic field has been applied, magnetization of the secondary recording layer 15 starts to orient into the plane of the layer. Due to exchange coupling interactions with this secondary recording layer 15, magnetization of the primary recording layer 16 also starts to tilt.

Next, as shown in FIG. 4C, when the inverse magnetic field is larger, just prior to reversal of the main recording layer 16, magnetization of the secondary recording layer 15 is oriented substantially within the plane of the layer and magnetization of the main recording layer 16 becomes about 45°. In this way, as with a 45° recording technique, the magnetization can be reversed with a smaller external magnetic field than if only a primary recording layer 16 were present.

The magnetic recording medium of to the invention is also characterized in that the magnetic recording layer 13 is separated, within the plane of the medium, into magnetic areas and nonmagnetic areas, which magnetic areas and nonmagnetic areas have regions regularly arranged circumferentially on the medium.

Such magnetic recording media are called patterned media. For example, the magnetic recording layer 13 may be separated into magnetic areas and nonmagnetic areas by a textured pattern 20 like that shown in circled region A of FIG. 1. The surface of the magnetic recording medium 1 has, as shown enlarged in FIG. 5, a servo signal region 22 for burst signals and for addresses and preambles (i.e., tracking and data access control), and a data track region 21 to which data is written. These regions 21 and 22 have been divided by the aforementioned pattern 20 into magnetic areas and nonmagnetic areas. Such a pattern 20 may be achieved by forming the above-described magnetic recording layer 13 then rendering it into the desired shape, by thin-film modification, or by using an ordinary thin film forming process to deposit a magnetic recording layer 13 on a substrate 11 that has been rendered into the desired shape. The data track region 21 may be continuous tracks as shown in FIG. 5, or may be tracks which are divided into single-bit units or multi-bit units as shown enlarged in FIG. 6.

Figure 5:
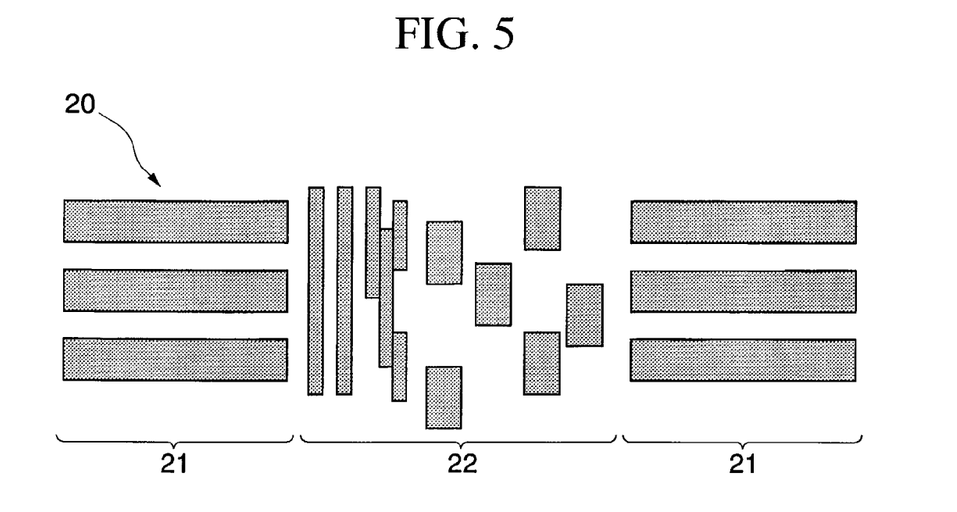
FIG. 5 shows, as an enlargement of the circled region A in FIG. 1, a plan view of a discrete track medium.
Figure 6:
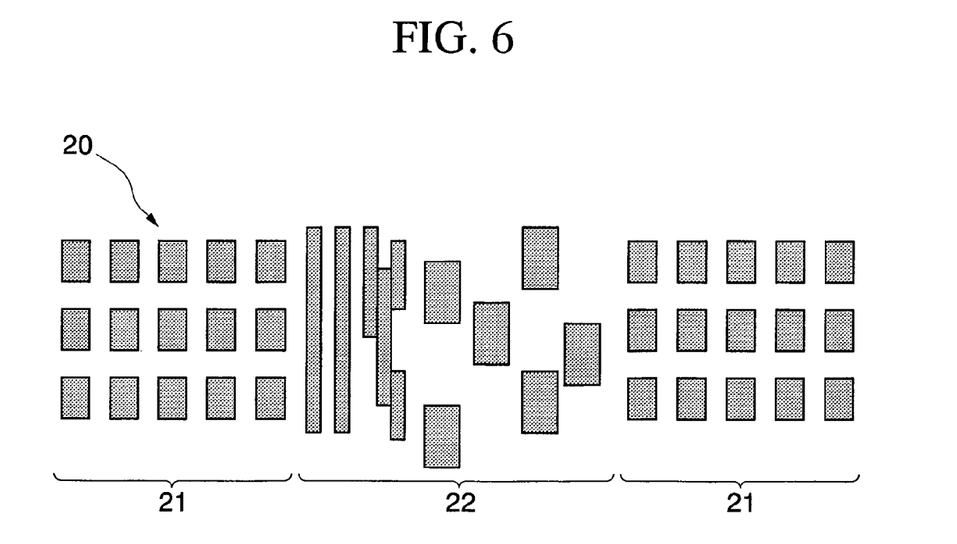
FIG. 6 shows, as an enlargement of the circled region A in FIG. 1, a plan view of a patterned medium.

The magnetic recording medium shown in FIG. 5 is also called a discrete track medium, while the magnetic recording medium shown in FIG. 6 sometimes being referred to as a patterned medium in the narrow sense of the term. In a discrete track medium, the linear recording density is determined, as in the current practice, by the magnetic transition width formed on the medium by the head. On the other hand, in the patterned medium shown in FIG. 6, the linear recording density is determined by the shape imparted to the substrate. A higher recording density can generally be achieved in the patterned medium shown in FIG. 6.

Figure 7:
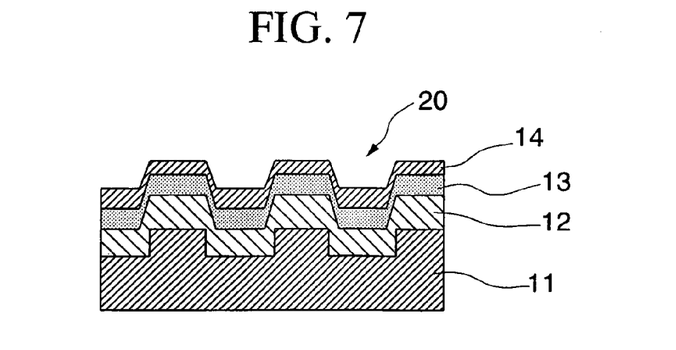
FIG. 7 is a cross-sectional view of a substrate etching type patterned medium.
Figure 8:
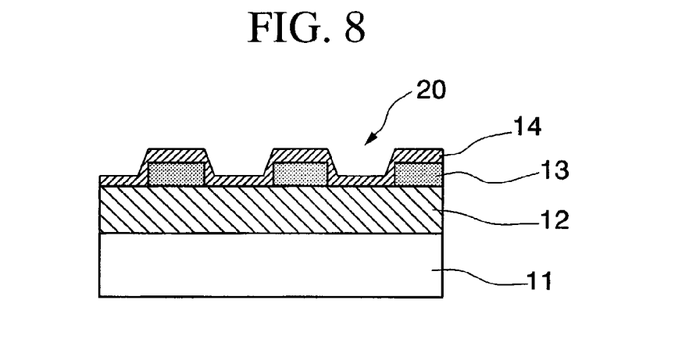
FIG. 8 is a cross-sectional view of a magnetic layer etching type patterned medium.

Patterned media include substrate etching type patterned media obtained by patterning the substrate 11 into a shape divided into servo signal regions 22 and data track regions 21 as shown in FIG. 7, and magnetic layer etching type patterned media obtained by patterning the magnetic recording layer 13 into a shaped divided into servo signal regions 22 and data track regions as shown in FIG. 8. In a magnetic layer etching type patterned medium shown in FIG. 8, so long as signals are obtained from the magnetic recording layer 13, etching may extend to the under layer 12 or substrate 11 there below. Alternatively, the magnetic material may remain at the bottom of the patterns (e.g., only the main recording layer 16 is shaped).

This invention may be applied to any of the patterned media shown in FIGS. 5 to 8, enabling a coercivity Hc reducing effect to be obtained in the patterned region. Accordingly, patterned regions may be present throughout the medium or only in portions of the medium. Also, patterned regions may be present continuously in the circumferential direction or may be present intermittently in the circumferential direction.

Next, the magnetic recording and reproducing apparatus according to the present invention is described.

Figure 9:
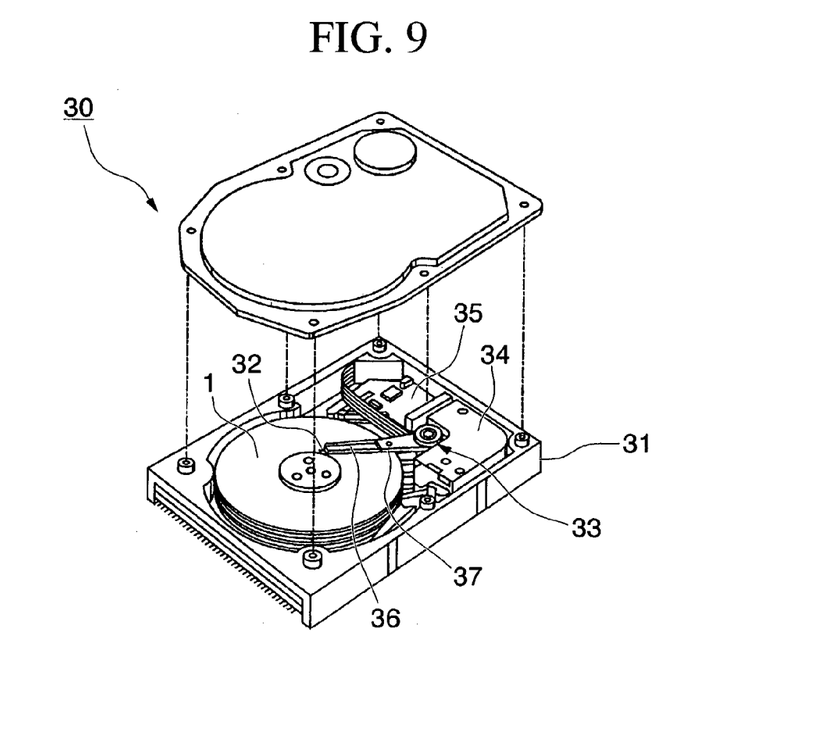
FIG. 9 is a perspective view of a magnetic recording and reproducing apparatus according to the invention.

The inventive magnetic recording and reproducing apparatus is exemplified by the hard disk drive (HDD) 30 shown in FIG. 9. This HDD 30, which uses a perpendicular magnetic recording technology to read and write various types of data, is composed of, within a housing 31, the above-described magnetic disk 1 which is mounted on a spindle motor (not shown) and is rotatably driven, a magnetic head 32 which writes signals to and reads signals from the magnetic disk 1, a head suspension assembly 33 on which the magnetic head 32 is mounted, an actuator 34 which drives the head suspension assembly 33, and a circuit board 35 which carries out control of the various components.

The magnetic head 32 is a combination head in which a write head and a read head are mounted on a common slider mechanism. As noted above, a coercivity Hc lowering effect is obtained in the magnetic recording medium of the invention. Because this effect is large when the orientation of the recording magnetic field is perpendicular to the medium, it is preferable to use a single-pole type magnetic head as the write head. A shielded pole construction may be employed in which the single-pole type magnetic head is provided with a shield. Alternatively, perpendicular magnetic recording may be carried out using s ring-type magnetic head such as is typically employed on longitudinal media. The read head may be, for example, a shielded magnetoresistive (MR) read head that uses a GMR layer or a TMR layer.

The head suspension assembly 33 supports the magnetic head 32 across from the recording side of the magnetic disk 1, and has a suspension 36 on the distal end of which is mounted the above-described slider mechanism, and an arm 37 which supports the proximal end of the suspension 36. The actuator 34 uses a voice coil motor (VCM) to position the magnetic head 32 via the head suspension assembly 33 at a given radial position on the magnetic disk 1. The circuit board 35 has a head IC chip, and carries out drive control of the head via the actuator 34 and data read or write control via the magnetic head 32.

EXAMPLES

The effects of the invention are illustrated more fully in the following examples.

Example 1

In Example 1, first an LLG simulation was carried to determine whether the above-described coercivity Hc lowering effect of the invention can occur within a practical range. The results of the simulation are shown in FIG. 10.

In this simulation, the magnetic anisotropy Ku of 6 Merg/cc and for the saturation magnetization of 500 emu/cc were chosen for the magnetic properties of the primary recording layer. These are values close to the properties of the CoCrPt used in the magnetic recording layer of perpendicular magnetic recording media. The magnetic anisotropy Ku of −4 Merg/cc and for the saturation magnetization Ms of 1,000 emu/cc were chosen for the magnetic properties of the secondary recording layer. These are values close to the properties of CoIr. The exchange coupling constant, both within the magnetic grains and between the primary recording layer and the secondary recording layer, was set at 0.5 µerg/cm. The mesh size of the simulation was set at 1 cubic nanometer, and calculations were carried out for a cylinder with a diameter of 8 nm and a height of 18 nm as the model.

Figure 10:
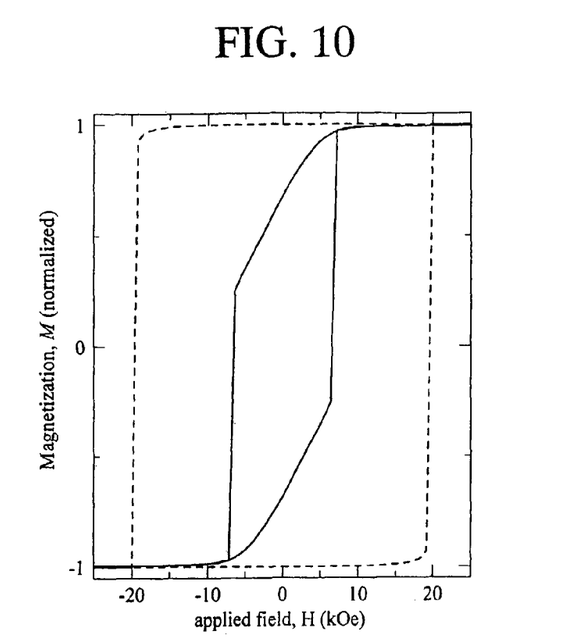
FIG. 10 is a graph showing a hysteresis loop obtained by a simulation of the invention.

From the results shown in FIG. 10, the dashed lines represent a hysteresis loop for the case in which the cylinder having a height of 18 nm is composed solely of the primary recording layer. The coercivity Hc is about 20 kOe. The solid lines represent the hysteresis for the case in which the primary recording layer has a thickness of 12 nm and the secondary recording layer has a thickness of 6 nm; here, the coercivity Hc (the value of the external magnetic field H when at M=0) is less than half as large. The value of M at H=0 (the remanent magnetization Mr) is smaller than the saturation magnetization Ms. This is mostly likely due to the in-plane component of the magnetization because magnetization at the interior of the secondary recording layer is not fully aligned with magnetization of the primary recording layer. The portion of the curve form H=0 to where magnetization changes abruptly near Hc indicates that this in-plane magnetization component rises gradually as the inverse magnetization field becomes larger. Moreover, in this portion of the curve, magnetization rotates reversibly, and returns to the value of Mr when the external magnetic field returns to zero. The abrupt change at coercivity Hc is irreversible; hence, when the external magnetic field is returned to zero, the magnetization becomes −Mr. Therefore, the magnetic field which induces a reversal of magnetization is Hc. This effect occurs so long as the magnetic anisotropy Ku of the secondary recording layer is negative and the easy plane of magnetization is the plane of the layer.

Next, simulations were carried out under the above conditions at varying primary recording layer and the secondary recording layer thicknesses. The results of these simulations are shown in FIG. 11.

Calculations in these simulations were carried out while keeping the combined thickness of the primary recording layer and the secondary recording layer fixed at 18 nm. Calculations were also carried out for cases in which the saturation magnetization Ms of the secondary recording layer was 600 emu/cc. In FIG. 11, the abscissa represents the thickness of the secondary recording layer, and the ordinate represents the coercivity Hc and the squareness S (Mr/Ms).

Figure 11:
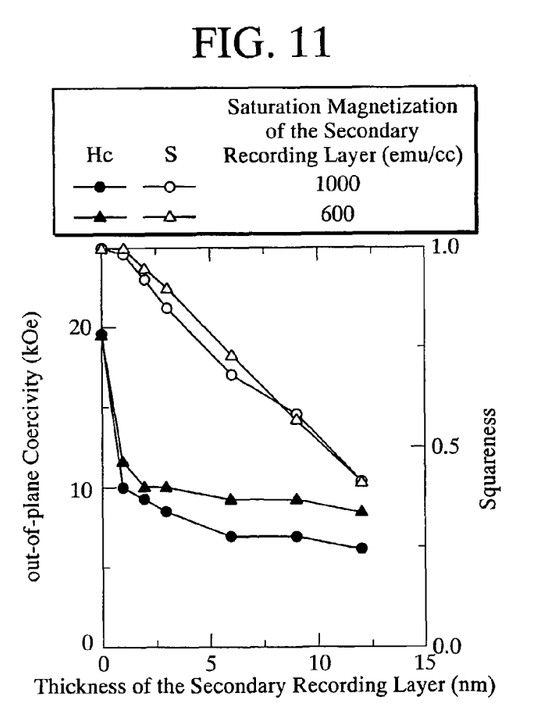
FIG. 11 is a graph of the thickness of the secondary recording layer in the invention versus coercivity and squareness.

It is apparent from the results shown in FIG. 11 that even at a thickness of 1 nm, the secondary recording layer has the effect of substantially halving the coercivity Hc. Moreover, because the squareness S decreases as the thickness of the secondary recording layer increases, a secondary recording layer with a smaller thickness is preferable from the standpoint of the read signal intensity. At a very small secondary recording layer thickness, the change in the total thermal fluctuation resistance becomes small. Moreover, the magnetic flux that passes through the magnetic pole head, the primary recording layer, the secondary recording layer, the intermediate under layer and the soft magnetic underlayer in this order encounters less interference.

This result is the same, regardless of whether the primary recording layer has been formed on the secondary recording layer or the secondary recording layer has been formed on the primary recording layer. It is also possible to insert the secondary recording layer between primary recording layers. In such a case, the exchange coupling interactions that act upon the secondary recording layer become twice as large, enabling the squareness S to be brought closer to 1.

Figure 12:
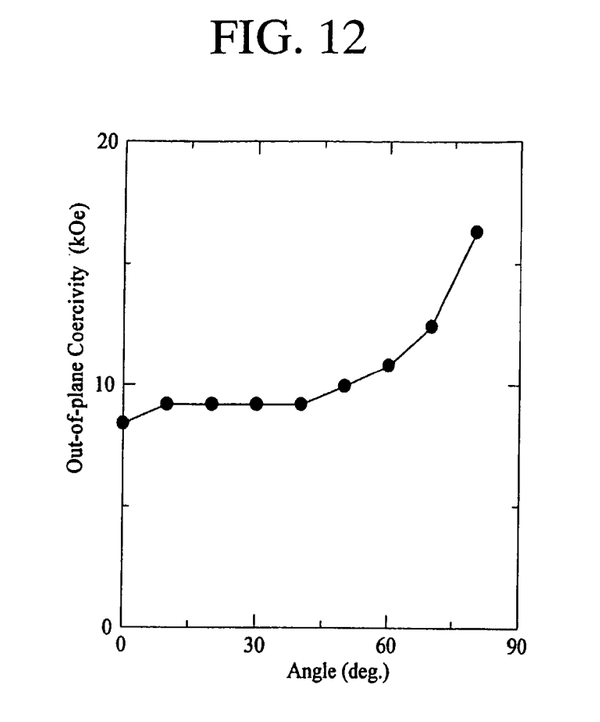
FIG. 12 is a graph of the angle at which the magnetic field is applied versus coercivity in the invention.

Next, simulations were carried out to investigate the angle dependence of the inventive magnetic recording medium. The results of these simulations are shown in FIG. 12.

In these simulations, calculations were carried out at the following values for the primary recording layer: magnetic anisotropy Ku, 6 Merg/cc; saturation magnetization Ms, 500 emu/cc; thickness, 12 nm. Values for the secondary recording layer were set as follows: magnetic anisotropy Ku, −4 Merg/cc; saturation magnetization Ms, 1,000 emu/cc; thickness, 6 nm.

When the primary recording layer is a single layer and that magnetization reversal follows the so-called S-W model, the angle dependence of the coercivity Hc is a downwardly convex curve having a minimum value at 45°. However, in the magnetic recording medium of the invention, the coercivity Hc exhibits a different angle dependence. That is, based on the results shown in FIG. 12, Hc is a value that is substantially the same from 0° to the vicinity of 45°. The reason appears to be that the magnetized structure always has a portion with a non-zero angle relative to the magnetic field.

The effects of this invention can also be achieved with a patterned medium wherein the magnetic recording layer is separated, within the plane of the medium, into magnetic areas and nonmagnetic areas, which magnetic areas and nonmagnetic areas have regions regularly arranged circumferentially on the medium. The medium may be suitably selected on the basis of such considerations as the type of HDD system to be manufactured and the production costs.

Example 2

In Example 2, magnetic disks for the 2.5 inch hard disk drive described below were fabricated based on the results of Example 1. First, a nonmagnetic glass substrate (TS-10SX, made by Ohara Inc.) was introduced into the vacuum chamber of a sputtering system (model C-3010, made by Canon ANELVA Corporation), following which the following layers were successively formed on the substrate under a vacuum of $1 \times 10^{-6}$ Pa: a soft magnetic under layer made of CoZrNb to a thickness of 100 nm, a seed layer of tantalum to a thickness of 5 nm, an under layer of platinum to a thickness of 10 nm, an under layer of ruthenium to a thickness of 10 nm, a primary recording layer of CoCrPt and $SiO_2$ to a thickness of $t_1=18$ nm, 17 nm, 15 nm, 9 nm, or 3 nm, a secondary recording layer of $Co_{80}Ir_{20}$ to a thickness of $(18-t_1)=0$ nm, 1 nm, 3 nm, 9 nm, or 15 nm and a protective layer of carbon to a thickness of 4 nm. Next, the substrate on which these successive layers had been formed was removed from the vacuum chamber, following which perfluoropolyether (PFPE) was applied by dipping to a thickness of 1.3 nm as a lubricant to the surface of the protective layer. Because film formation was carried out continuously in a vacuum state, an interfacial layer such as a surface oxide layer did not form between the primary recording layer and the secondary recording layer, as a result of which a good exchanged-coupled state was obtained at the interface between these two layers. The target used in the formation of the primary recording layer had a composition of $((Co_{90}Cr_{10})_{80}Pt_{20})_{90}$—$(SiO_2)_{10}$. The numbers in parentheses ( ) here indicate the compositional ratios of the constituents in atomic percent.

Next, the fabricated magnetic recording medium was sliced in such a way to examine the portions of the secondary recording layer and primary recording layer by a transmission electron microscope (TEM). The medium was found in this way to have a granular structure composed of, as shown in FIG. 3, magnetic grains and a nonmagnetic material surrounding the particles. The sample had a thickness of about 10 nm. Sequential EDX measurements were taken, whereupon it was confirmed that signals from the ruthenium under layer were low.

The nonmagnetic material portion of the medium is composed primarily of $SiO_2$; EDX analysis of this portion confirmed the presence of cobalt and chromium peaks. Given that constituent elements of the primary recording layer and the secondary recording layer were detected in this EDX analysis, the secondary recording layer and the primary recording layer appear to overlap at the magnetic grain portions. A cross-section of the sample was therefore examined with a transmission electron microscope (TEM), from which it was found that the sample had a cross-sectional structure like that shown in FIG. 2. Also, in the secondary recording layer, although no particular elements for separating the particles have been added, it does appear as if a granular structure has formed due to the diffusion of elements such as silicon from the primary recording layer. Such a granular structure appears to be caused in part by, during formation of the secondary recording layer, selective deposition of CoIr on the related alloy CoCrPt and selective deposition of oxides such as Co—O that inevitably form during such film formation on a matrix material composed primary of SiO2.

When the primary recording layer had a thickness $t_1$ of 18 nm, i.e., when there was no secondary recording layer, the coercivity Hc was 5.4 kOe. When the primary recording layer had a thickness $t_1$=17 nm, 15 nm, 9 nm or 3 nm, a hysteresis similar to that in FIG. 10 was obtained for each of these samples. In addition, when the coercivity Hc was estimated at a position in each sample where the magnetization changes abruptly, respective results of 3.9 kOe, 3.5 kOe, 2.8 kOe and 2.5 kOe were obtained. In each case, a coercivity Hc decreasing effect was confirmed, but the reduction in Hc is not the same as the results of the above simulation. The possible reason is that the perpendicular magnetic anisotropy of the primary recording layer is not oriented entirely perpendicular to the plane of the layer; instead, it has a variance of about 5° in terms of the angle and/or a variance of about 10% in terms of the strength.

Based on estimates obtained by torque measurement, the magnetic anisotropy Ku of CoIr was found to be about −4 Merg/cc. The sample with a primary recording layer thickness $t_1$ of 3 nm had a small remanent magnetization Mr. This media is not useful for a magnetic recording medium.

Next, using a magnetic recording medium in which CoIr serves as the secondary recording layer, a magnetic recording and reproducing apparatus like that shown in FIG. 9 was built. In this magnetic recording and reproducing apparatus, a ring head commonly employed on longitudinal media was used as the write head, the disk rotational speed was set at 4,500 rpm, and a signal of 50 MHz was recorded. As a result, writing could be carried out only to samples having a coercivity Hc of less than 3 kOe. Because writing could not be fully carried out on the other samples, distortions in the waveform were clearly observed on an oscilloscope.

Next, a magnetic recording and reproducing apparatus that uses a single-pole type head as the write head was used for write operations under the same conditions as above. Complete writing was observed for the samples having a primary recording layer thickness $t_1$ of 17 nm, 15 nm or 9 nm. The sample having a primary recording layer thickness $t_1$ of 18 nm was not written well and showed distortions in the waveform were observed on an oscilloscope.

Example 3

A magnetic recording medium similar to that in Example 2 was produced, except that the samples were prepared in which the thickness $t_1$ of the primary recording layer was set at 9 nm, and the material making up the secondary recording layer was CoFe, MnSb, FeC or $Fe_3Pt$. All of these samples had a coercivity Hc of 3 to 4 kOe, indicating that a coercivity Hc reducing effect was obtained.

Example 4

A magnetic recording medium similar to that in Example 2 was produced, except that the following layers were successively formed on the substrate: a 7 nm thick under layer of titanium, a 3 nm thick under layer of ruthenium, a 5 nm thick secondary recording layer of CoIr and $SiO_2$, and a 4 nm thick protective layer of carbon. The CoIr—$SiO_2$ layer was formed by simultaneous three-source sputtering from a Co—$SiO_2$ target, a cobalt target and an iridium target.

Figure 13:
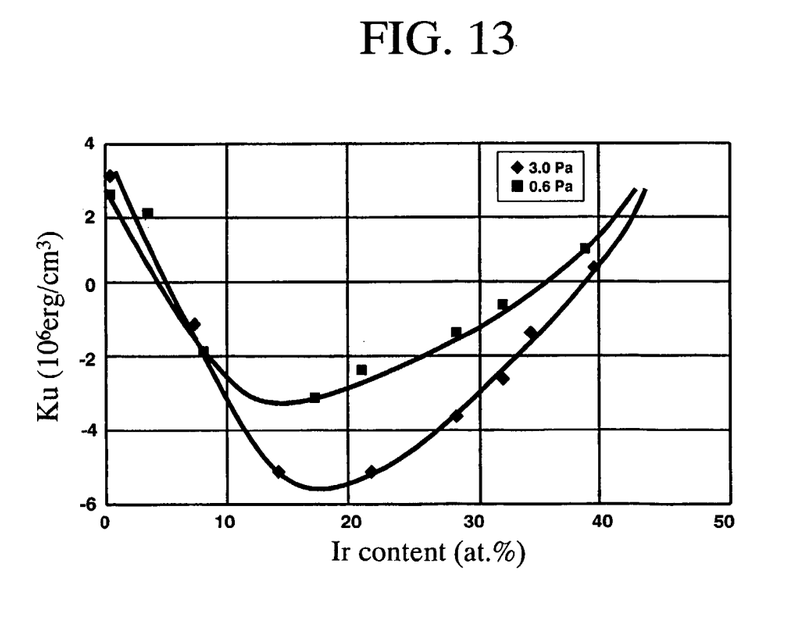
FIG. 13 is a graph of the iridium content in the secondary recording layer in the invention versus magnetic anisotropy Ku.

In Example 4, first, the volumetric ratio of $SiO_2$ was set to 10% and the magnetic anisotropy Ku at varying iridium atomic compositional ratios was measured. Those results are shown in FIG. 13. It is apparent from FIG. 13 that, although differences arose due to the pressure at the time of film formation (argon was used as the sputtering gas), the magnetic anisotropy Ku was negative within an iridium content range of 5 to 40 atomic percent.

Next, using a magnetic recording medium in which this CoIr—$SiO_2$ is employed as the secondary recording layer, a magnetic recording and reproducing apparatus like that shown in FIG. 9 was built. The magnetic recording medium was obtained by successively forming the following layers on a glass substrate: a 7 nm thick under layer of titanium, a 3 nm thick under layer of ruthenium, a 5 nm thick secondary recording layer of CoIr and $SiO_2$, a 13 nm thick primary recording layer of CoCrPt and $SiO_2$, and a 4 nm thick protective layer of carbon. Because this magnetic recording medium does not use a soft magnetic underlayer (SUL), recording with a ring head is possible.

Magnetic recording media in which the iridium atomic composition ratio was set at, variously, 0, 5, 10, 20, 30, 40 and 50 atomic percent were produced, and write operations were carried out under the same conditions as above. On the magnetic recording media having iridium contents of 0 and 50 atomic percent, because writing could not be fully carried out, distortions in the waveform were observed on an oscilloscope. In the magnetic recording medium having an iridium content of 0 atomic percent, this was most likely due to an increase in the average saturation magnetization because the secondary recording layer was composed entirely of cobalt, resulting in the formation of an arbitrary magnetic domain due to magnetostatic interactions. In the magnetic recording medium having an iridium content of 50 atomic percent, the secondary recording layer had a small saturation magnetization Ms and the magnetic anisotropy Ku was positive. This results in a coercivity close to the value for the primary recording layer and making it impossible to record with a ring head. A coercivity Hc lowering effect was achieved in all of the other magnetic recording media, enabling ordinary write operations to be carried out even with a ring head.

Example 5

Aside from successively forming on the substrate a 7 nm thick under layer of titanium, a 10 nm thick primary recording layer of CoCrPt and $SiO_2$, a 3 nm thick secondary recording layer, a 5 nm thick primary recording layer of CoCrPt and $SiO_2$ and a 4 nm thick protective layer of carbon, a magnetic recording medium similar to that in Example 2 was produced. The coercivity Hc of this magnetic recording medium was estimated to be 3.0 kOe, indicating that an even better coercivity Hc reducing effect can be achieved than in Example 2. The squareness was also found to be improved.

Next, a magnetic recording and reproducing apparatus like that shown in FIG. 9 was built using this magnetic recording medium, and write operations were carried out under the same conditions as in Example 2. A single-pole type magnetic head was used as the write head. As a result, compared with the case in Example 2 where the primary recording layer had a thickness $t_1$ of 15 nm, the signal intensity increased by 10% and the signal-to-noise ratio (SNR) increased about 2 dB. This is most likely on account of a higher coercivity Hc reducing effect and an increase in squareness.

INDUSTRIAL APPLICABILITY

As noted above, the present invention provides a tilted-type perpendicular magnetic recording medium which, by exchange-coupling a primary recording layer having a granular structure with a secondary recording layer having a negative crystal magnetic anisotropy, is easy to manufacture and lends itself readily to medium design. The invention also provides a magnetic recording and reproducing apparatus which uses such a magnetic recording medium.

The invention claimed is:

1. A magnetic recording medium comprising:
a substrate;
an under layer formed on the substrate;
a magnetic recording layer formed on the under layer; and
a protective layer formed on the magnetic recording layer,
wherein the magnetic recording layer comprises
a primary recording layer, which has magnetic grains and a nonmagnetic material that surrounds the magnetic grains, and has a perpendicular magnetic anisotropy; and
a secondary recording layer, which is made of a material having a negative crystal magnetic anisotropy, and its easy plane of the magnetization is a plane of the medium, and
the primary recording layer and the secondary recording layer are mutually exchange-coupled.

2. A magnetic recording medium according to claim 1, wherein the magnetic recording layer is separated into magnetic areas and nonmagnetic areas within the plane of the medium, and the magnetic areas and the nonmagnetic areas have regions regularly arranged circumferentially on the medium.

3. A magnetic recording medium according to claim 1, wherein the crystal magnetic anisotropy of the material having the negative magnetic anisotropy of the secondary recording layer has an absolute value of at least $10^5$ erg/cc.

4. A magnetic recording medium according to claim 1, wherein the secondary recording layer has a thickness of at least 1 nm.

5. A magnetic recording medium according to claim 1, the secondary recording layer has a thickness which is not more than one-half the thickness of the primary recording layer.

6. A magnetic recording medium according to claim 1, wherein the secondary recording layer comprises one or more types of alloy selected from among CoIr, CoFe, MnSb, FeC and $Fe_3Pt$.

7. A magnetic recording medium according to claim 1, wherein the secondary recording layer is CoIr and has an iridium content of 5 to 40 atomic percent.

8. A magnetic recording medium according to claim 1, having, below the secondary recording layer, an crystalline under layer with hexagonal close-packed lattice planes or tetragonal lattice planes oriented within a plane parallel to the substrate.

9. A magnetic recording and reproducing apparatus comprising:
a magnetic recording medium according to claim 1, and
a magnetic head which writes signals to and reads signals from the magnetic recording medium.

10. A magnetic recording and reproducing apparatus according to claim 9, wherein the magnetic head is a single-pole type magnetic head.

* * * * *